May 12, 1925.
E. W. WEBB
1,537,100
ROLLER SIDE BEARING
Filed Nov. 2, 1922
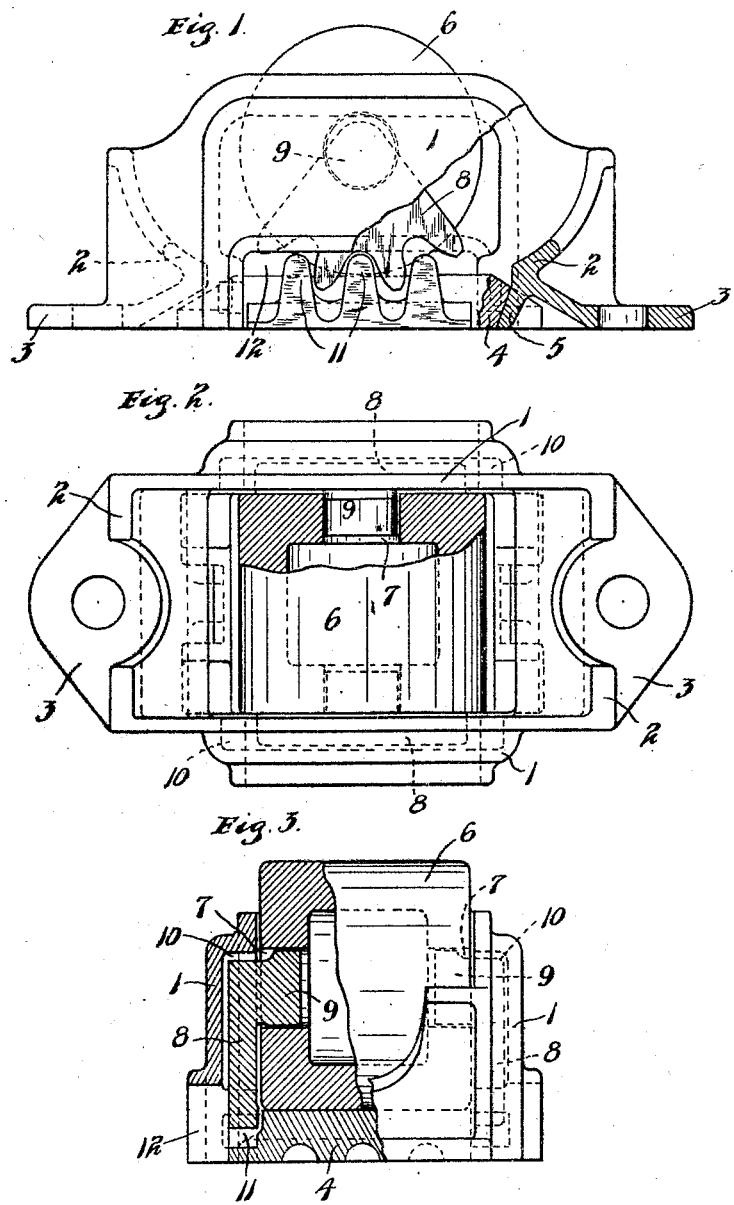
INVENTOR.
EDWIN W. WEBB.
BY HIS ATTORNEY.
James T. Williamson Patented May 12, 1925.

1,537,100

UNITED STATES PATENT OFFICE.

EDWIN W. WEBB, OF CHICAGO, ILLINOIS, ASSIGNOR TO STANDARD CAR TRUCK COMPANY, OF CHICAGO, ILLINOIS, A CORPORATION OF NEW JERSEY.

ROLLER SIDE BEARING.

Application filed November 2, 1922. Serial No. 598,526.

*To all whom it may concern:*

Be it known that I, EDWIN W. WEBB, a citizen of the United States, residing at Chicago, in the county of Cook and State of Illinois, have invented certain new and useful Improvements in Roller Side Bearings; and I do hereby declare the following to be a full, clear, and exact description of the invention, such as will enable others skilled in the art to which it appertains to make and use the same.

This invention relates to a side bearing for railway cars adapted to be disposed between the truck and body bolsters of such a car.

It is an object of this invention to provide a side bearing of the counterweighted type comprising very few parts and one which is very compact in arrangement.

It is a further object of this invention to provide such a side bearing having a bearing roller with an axial opening therein and having a counterweight provided with a portion disposed in said opening.

It is still another object of the invention to provide such a side bearing having a bearing plate, a bearing roller movable thereon and a counterweight member carried by the roller having teeth engaging teeth on said bearing plate.

It is a still further object of the invention to provide such a bearing comprising a bearing roller and a counterweight movable therewith, both of which are disposed in a housing.

It is more specifically an object of the invention to provide a four-piece side bearing comprising a housing, and a bearing plate, a bearing roller movable thereon, and a counterweight movable with said roller, all disposed in said housing.

These and other objects and advantages of the invention will more fully appear from the following description made in connection with the accompanying drawings in which like reference characters refer to the same parts throughout the different views, and in which, Fig. 1 is a view in side elevation of the device with certain parts broken away and shown in section;

Fig. 2 is a top plan view of the device with certain parts shown in section; and Fig. 3 is a view partly in vertical section and partly in end elevation of the device.

Referring to the drawings, the device comprises a housing of generally rectangular shape having side walls 1 and end walls 2, the latter being curved in accordance with the curvature of the bearing roller to be later described. The side walls of the housing are continued at each end as vertical flanges extending to the base portion 3, which base portions are shown provided with holes for the usual attaching means. The end walls also have curved cutout portions at each end forming openings to permit the insertion of the fastening means. The housing has a substantially rectangular opening in the bottom thereof and a bearing plate 4 is disposed in this opening with its bottom substantially flush with the bottom of the housing. Said plate has central recesses in its end portions with downwardly inclined end walls and lugs 5 on the housing are bent to engage these end walls to hold the bearing plate in position. It will be understood that the bearing plate is inserted from the bottom of the housing with the lugs 5 substantially in vertical position, the lugs being bent to the position shown in Fig. 1, subsequently to the insertion of said plate. The bearing plate 4 has a flat substantially horizontal top surface and supports a bearing roller 6 which is movable thereon longitudinally of the housing. The bearing roller is shown as having a central cored opening with which communicates axial bores 7 at each end of the roller. A counterweight member 8 is provided at each end of the roller, which member is of substantially flat sector shape and has a hub portion 9 projecting into the bore 7 of roller 6, the diameter of the said hub being slightly less than the diameter of said bore. The counterweights 8 are thus supported by the roller, directly engage the same and depend therefrom closely adjacent the sides thereof. It will be noted that the side walls 1 of the housing are extended outward and provided with a recess 10 in which the counterweight 8 is disposed and adapted to travel. The counterweight 8 is provided with gear teeth at its outer or lower edge and these teeth are adapted to engage with teeth 11 of a fixed rack member. In the embodiment of the invention illustrated, this rack member is formed directly on the plate 4 at each side thereof. It will also be noted that the housing is provided with openings 12 at each side thereof, which openings are surrounded by a suitable strengthening rib and which are disposed opposite the teeth 11 on the plate 4 so that said teeth and the lower portion of the teeth on the counterweight are visible through said opening.

In operation, when relative motion occurs between the roller 6 and the other parts, as when the car is rounding a curve, the roller will travel on the plate 4 and will carry the counterweight 8 therewith. Because of the engagement of the teeth on the counterweights with the teeth on the plate, however, the counterweight will be moved out of central vertical position. When out of such central vertical position, said weights tend to resume the same and the roller 6 will thus be returned to its central position when free to do so.

In assembling the device, the counterweights will be placed with their portions 9 in the roller and both will then be placed in the housing from the bottom. The plate 4 will then be placed in position and the lugs 5 bent to hold the plate in the housing.

From the above description it is seen that applicant has provided an extremely compact, simple and efficient structure of side bearing. By supporting the counterweights swingingly and directly in the roller, a pin passing through the roller which has heretofore been used is eliminated. Also, by so supporting the counterweights and placing the teeth on the bearing plate, the counterweights can be disposed inside of the housing and in close proximity to the roller. A bearing of small width is thus made possible. The roller is self-centering by reason of the counterweight and the counterweights have sufficient freedom of movement to insure against any binding thereof. The whole structure can be made in one foundry or forge plant of one material, depending upon whether the parts are forged or made of cast steel.

It will, of course, be understood that various changes may be made in the form, details and arrangement of the parts without departing from the scope of applicant's invention, which, generally stated, consists in the matter shown and described and set forth in the appended claims.

What is claimed is:

1. A side bearing for railway cars having in combination, a housing, a bearing plate, a roller supported on and movable on said plate, a counterweight member supported by and directly engaging said roller disposed adjacent the side thereof and swingable relatively thereto, and a fixed rack with which said counterweight engages, said counterweight depending from said roller and said rack being formed on said bearing plate.

2. A side bearing having in combination, a housing, a bearing plate therein, a bearing roller supported on and movable on said plate, a counterweight supported by said roller and depending at one side thereof, and teeth formed at one side of said plate with which said counterweight engages.

3. A side bearing comprising a housing, a bearing plate, a roller supported on and movable on said plate having axial bores at each end, a counterweight at each side of said roller having a hub disposed in said roller and depending therefrom, said counterweight having teeth and said bearing plate having racks with which said teeth engage.

4. A side bearing for railway cars having in combination, a housing adapted to be supported on the truck bolster, a bearing plate in the bottom of said housing, a roller supported and movable on said plate, and a counterweight within said housing supported by and depending from said roller, and fixed means loosely engaged by the lower end of said counterweight adapted to swing the same out of normal central position when said roller is moved whereby said roller will be returned to normal position by said counterweight.

5. A side bearing for railway cars having in combination, a housing adapted to be supported on the truck bolster, a bearing plate in the bottom of said housing, a roller supported and movable on said plate, a counterweight having teeth at its lower end carried by said roller and depending along the side thereof and between said roller and housing, and a rack engaged by the teeth on said counterweight.

6. The structure set forth in claim 5, said housing having a lateral opening therethrough through which said teeth on said counterweight and the teeth on said rack are exposed in said housing.

7. A side bearing for railway cars having in combination, a housing adapted to be supported on the truck bolster and having substantially vertical side walls, a bearing plate in the bottom of said housing, a roller supported and movable on said plate, a comparatively thin plate-like counterweight supported by said roller between one side wall of said housing and the side of said roller and closely adjacent the same, and a fixed means engaged by the lower end of said counterweight for swinging the same out of normal central position when said roller moves.

8. A side bearing for railway cars having in combination, a housing, a bearing plate therein, a roller having its lower portion resting on and movable on said bearing plate and a counterweight carried by and depending loosely from said roller having a rigid trunnion journaled in said roller and movable relatively to said roller.

9. A side bearing having in combination, a housing, a bearing plate at the bottom thereof, a bearing roller resting on and movable on said plate, a counterweight carried by said roller movable therewith and depending at the side thereof between said roller and housing, said counterweight having teeth formed thereon below the axis of said roller, and said bearing plate having teeth formed thereon with which said teeth on the counterweight loosely engage.

In testimony whereof I affix my signature.

EDWIN W. WEBB.